Figure 1:
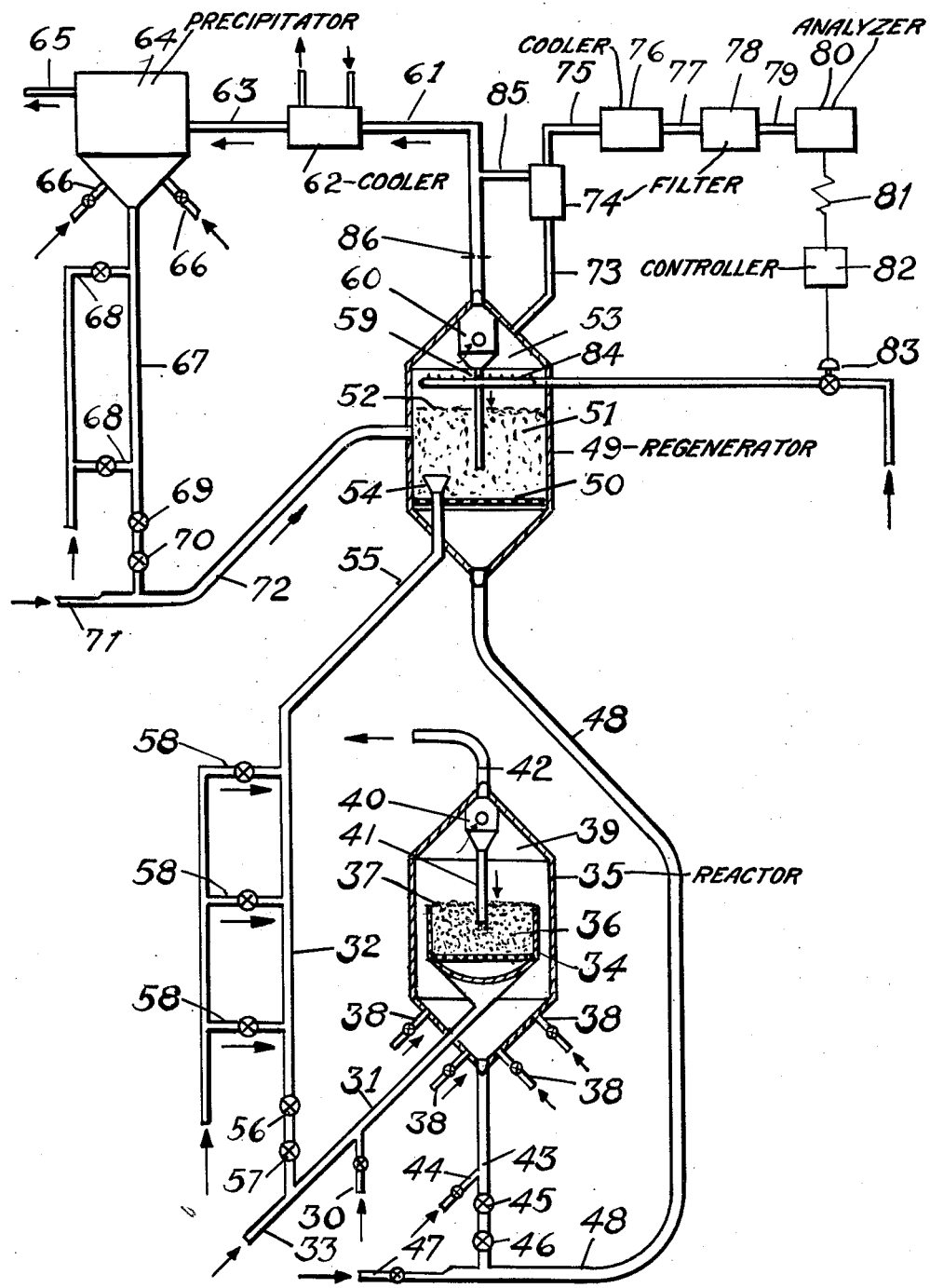
Figure 2:
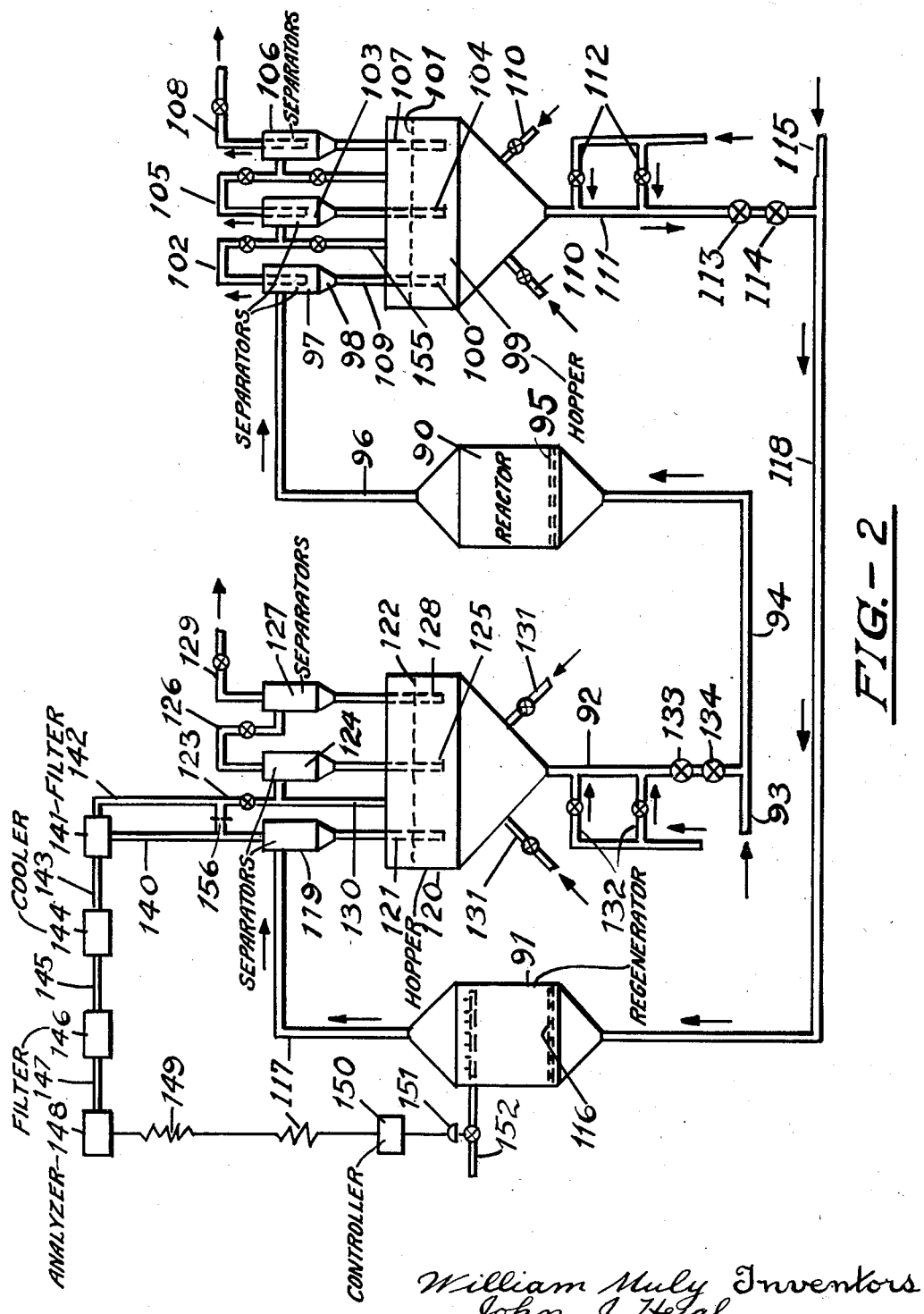
Figure 5:
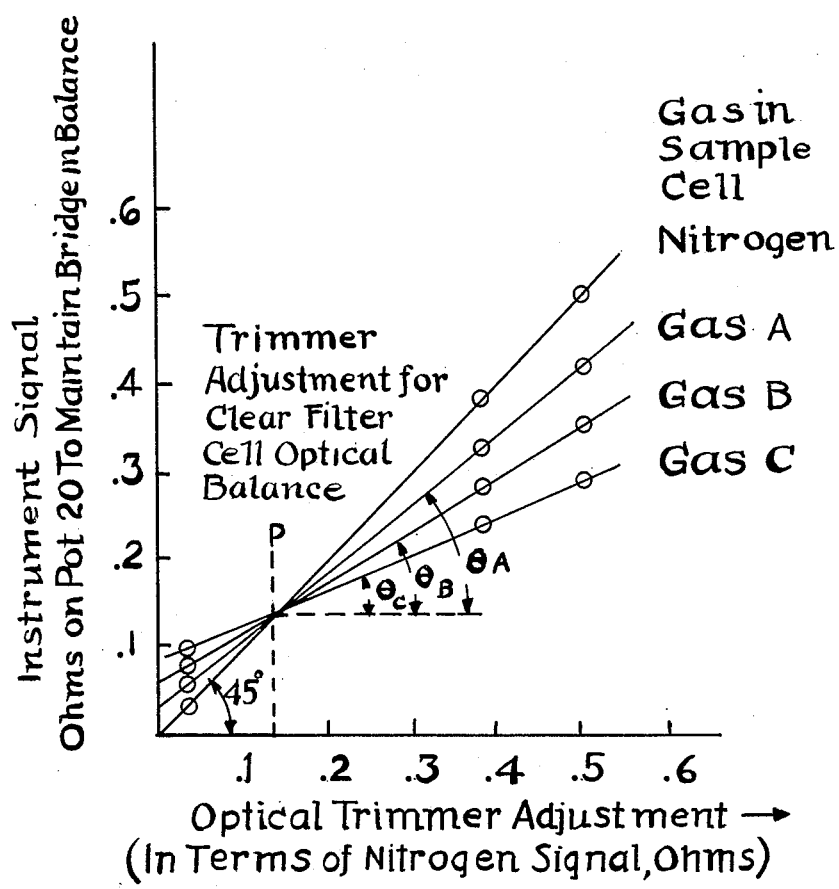
Figure 6:
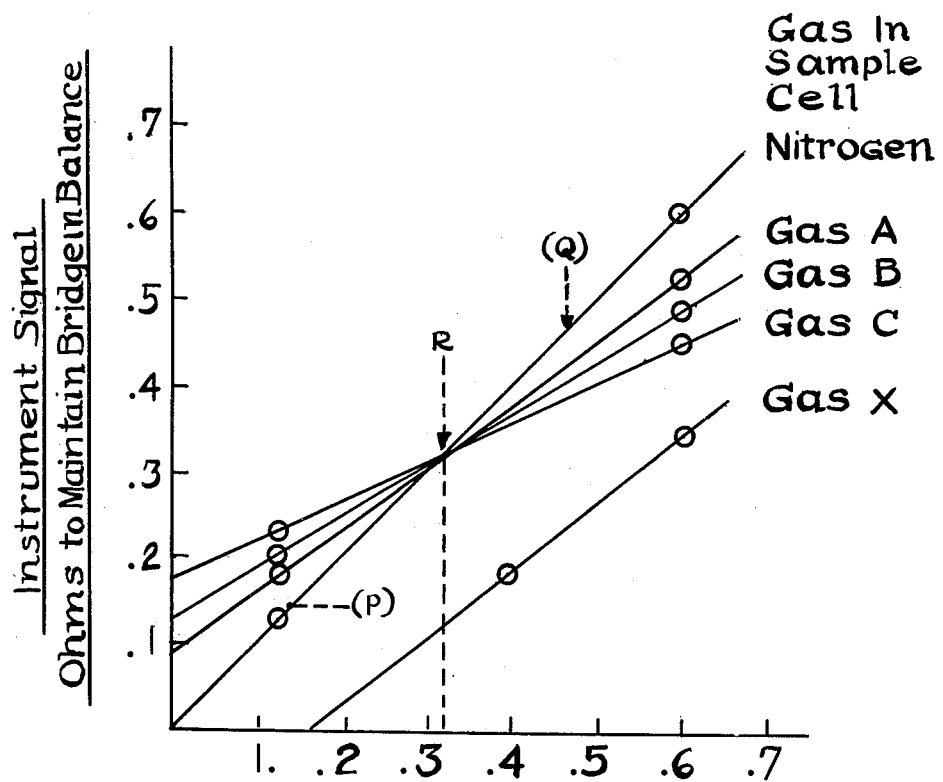
Figure 7:
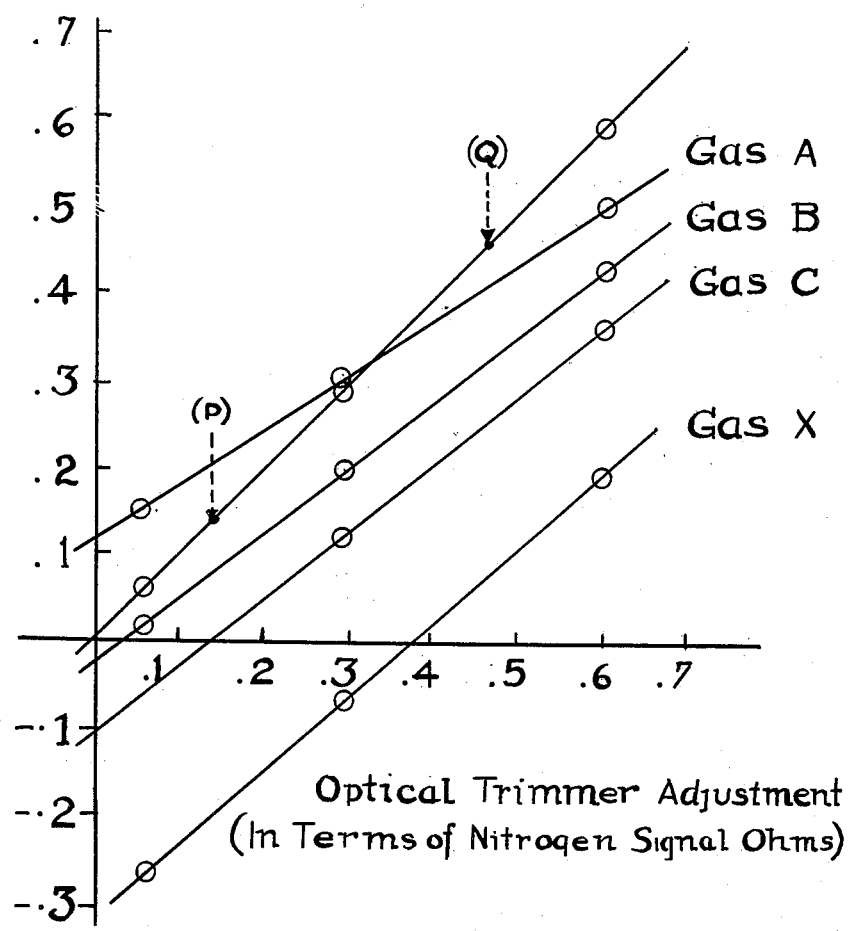

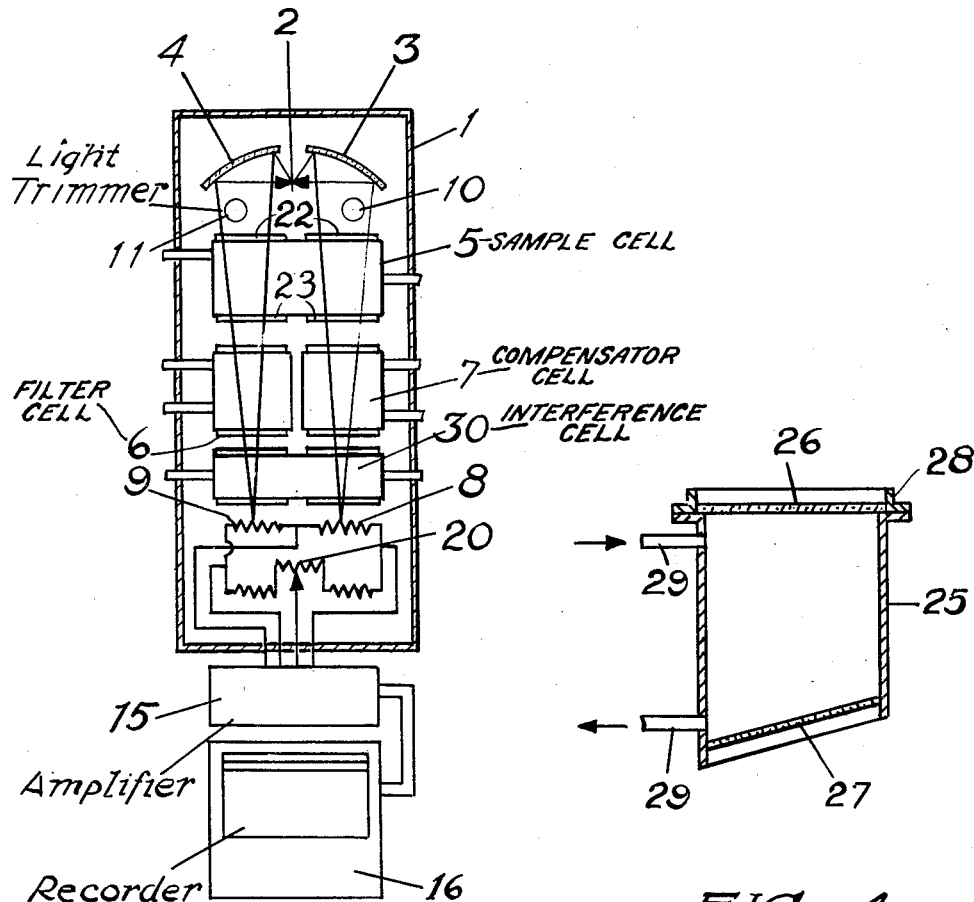

March 13, 1951 W. MULY ET AL 2,545,162
METHOD OF DETECTING INCIPIENT AFTERBURNING
DURING REGENERATION
Filed Sept. 24, 1948 7 Sheets-Sheet 4

FIG.—6

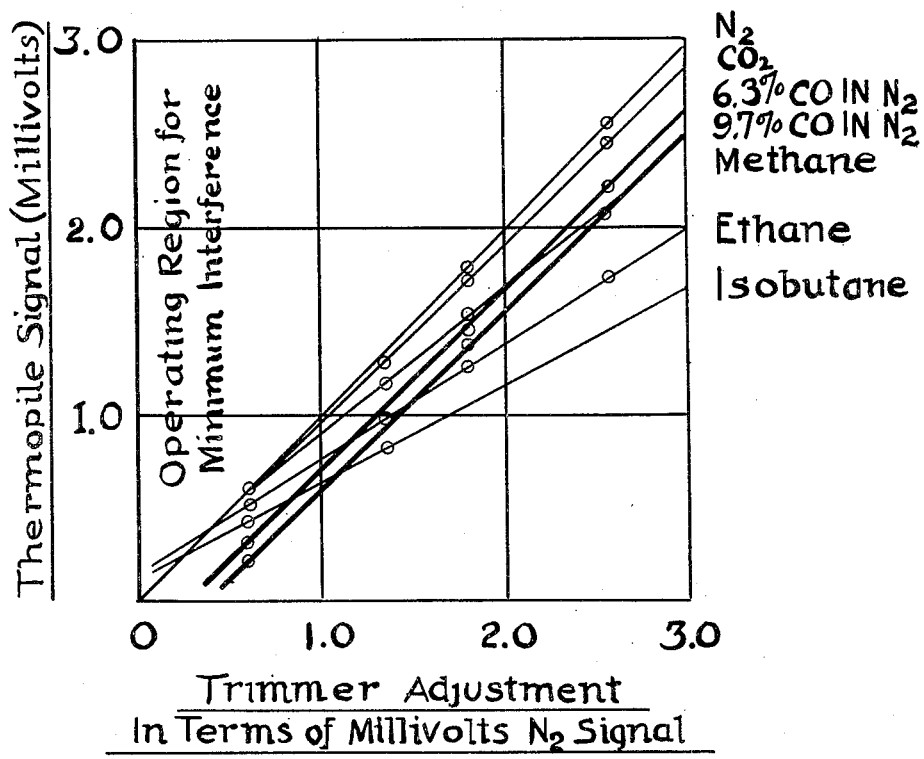
Fig.—8

Patented Mar. 13, 1951

2,545,162

UNITED STATES PATENT OFFICE 2,545,162

METHOD OF DETECTING INCIPIENT AFTER-BURNING DURING REGENERATION

William Muly, Baltimore, Md., and John J. Heigl, Cranford, N. J., assignors to Standard Oil Development Company, a corporation of Delaware Application September 24, 1948, Serial No. 51,054

5 Claims. (Cl. 252—417)

1

This invention relates to the regeneration of solid particles containing combustible deposits by burning with air or other oxygen-containing gas, and more particularly relates to the regeneration of spent catalyst particles used in hydrocarbon conversion operations. In accordance with this invention, the rate of change of carbon monoxide gas present in the regenerator is employed as a critical control factor to maintain the regenerator at optimum operating conditions.

In organic reactions using sub-divided catalysts or powdered catalysts, the catalyst particles become deactivated by combustible deposits which have to be removed before the catalyst can be used over again. In the catalytic conversion of hydrocarbons, coke or carbonaceous material is deposited on the catalyst particles which results in deactivation of the catalyst particles and these deposits are usually removed by burning with air or oxygen-containing gas.

In the regeneration of the spent catalyst the catalyst is mixed with air and the coke or carbonaceous material is burned off. When using sub-divided catalysts or powdered catalysts the velocity of the upflowing regenerating gas in the regenerator is so selected to maintain the particles in a dry fluidized dense condition in which the fluidized mixture simulates a liquid and the mixture has many other properties of a liquid. The regenerated catalyst particles may pass overhead with the regeneration gases or the regenerated catalyst may be withdrawn from the body of the fluidized mixture in a dense phase and the regeneration gases containing entrained catalyst may be removed from the top of the regeneration zone.

During regeneration by burning, the gases contain $CO_2$, CO and air, and when these gases pass through certain parts of the unit, there is a possibility of burning of the CO. This burning is generally referred to as after-burning, and is more apt to occur in the dilute phase, that is, in the relatively light suspension of solids in gases remaining after most of the solid particles have been removed from the gas. After-burning is not critical in the dense bed because there are sufficient solids present to absorb the heat released by regeneration and excessive temperatures do not result from the combustion in the bed. However, when after-burning occurs in the dilute phase, the gases rapidly attain an extremely high temperature resulting in the overheating of catalyst particles and in possible damage to the equipment. As a result, a good deal of catalyst may be completely lost from the

2 system and the entire heat balance of the operation is thrown off. The results of such after-burning, therefore, are to materially decrease the efficiency of operation.

It is therefore the principal object of this invention to provide a means for controlling regeneration so as to prevent after burning. It is a further object of this invention to provide a control means for critically determining the rate of fresh catalyst addition to the reactor, the rate of catalyst recirculation, the throughput rate, the cooling to be applied in the regenerator, and other operating variables.

In accordance with this invention the possibility of after-burning is substantially eliminated and a means for controlling operating variables is provided by obtaining a continuous and substantially instantaneous record of the carbon monoxide content in the regenerator flue gases. By reference to the carbon monoxide content thus obtained, it is possible to control the critical process variables of the process so as to secure optimum operating conditions. This is possible by virtue of the fact that it has now been discovered that inchoate after-burning is indicated by a rapid rise in carbon monoxide content just prior to the actual start of after-burning. Furthermore, it has been discovered that the variation of any operating variable causing a change in carbon monoxide gas in the regenerator flue gas exceeding a particular critical value must be avoided. These objects and other advantages of this invention as well as the nature of this invention, will be made clear from a consideration of the following description in connection with the accompanying drawings.

In these drawings

Figure I illustrates one embodiment of a fluidized operation employing sub-divided or powdered catalyst.

Figure II represents a different embodiment of the fluidized operation employing different operating principles than those of Figure I.

The remaining figures of the drawings illustrate suitable apparatus to continuously obtain an analysis of the carbon monoxide content. In these figures, Figure III represents a suitable type of infra-red gas analysis apparatus.

Figure IV represents a particular type of sample cell to be preferably used in the apparatus of Figure III.

Figures V, VI, and VII illustrate the manner in which the apparatus of Figure III is employed to obtain an accurate analysis of the carbon monoxide content.

Referring now to Figure I, the reference numeral 30 designates a line through which a reactant is introduced into line 31 where it is mixed with regenerated catalyst or contact particles introduced into line 31 from line 32. The reactant may be in heated vapor or gaseous form, or it may be partly preheated liquid in which case the heat necessary to vaporize the liquid and to carry out the reaction is provided by the hot regenerated catalyst from line 32.

In the catalytic conversion of hydrocarbons, the reactant passing through line 30 may be a hydrocarbon oil such as gas oil, light gas oil, heavy gas oil, naphtha, crude oil, reduced crude oil, residual oil, or other suitable hydrocarbon stock to be converted. The catalyst is a suitable conversion catalyst. In the catalytic cracking of hydrocarbons, the catalyst may be acid treated bentonite clay, or synthetic silica alumina or silica magnesia gel. Other suitable catalysts may be used. When reforming naphthas, reforming catalysts such as alumina supported on group VI metals, or cobalt, nickel, iron or compounds of group VI oxides with nickel, cobalt, or iron may be used. In the form of the invention shown in Figure I the catalyst is preferably in powdered form having a size of about 200 to 400 mesh or finer, but coarser catalysts or contact particles may be used. In the catalytic cracking of hydrocarbons, about one to thirty parts of catalyst to one of oil by weight may be used. The temperature during cracking is about 800–1000° F. Higher or lower temperatures may be used for other reactions.

Where the oil is in vapor form it may be introduced through line 33 at about the point where the catalyst passes from line 32. Where the oil is in liquid form, or partly in liquid and partly in vapor form, a gas such as a hydrocarbon gas or in some instances, steam, may be introduced through line 33 to prevent the catalyst particles from packing below the point of introduction of oil through line 30. The mixture of catalyst particles and reactant passes through line 31 and through distributor head 34 positioned in the lower portion of the reaction vessel 35. The distribution head 34 is provided with a plurality of holes for distributing the catalyst particles and reactant across the area of the reaction zone. The velocity of the reactant vapors or gases is so selected that the powdered catalyst is maintained as a dry fluidized bed 36, having many of the characteristics of a liquid. The fluidized bed has a level indicated at 37. The velocity of the vapors or gases may be between about one-half foot per second and two feet per second. The density of bed 36 when using powdered silica alumina gel catalyst is about 10 to 25 lbs. per cubic foot. Sufficient fluidizing gas is blown upwardly into the reactor through the lines 38 to maintain these operating conditions.

The reaction products in vapor form leave the fluidized bed 36 and pass into the upper portion 39 of the reaction vessel 35. The upper portion 39 is referred to as a dilute phase which means that only a small amount of catalyst particles are suspended in the vapors or reaction products. The reaction products pass through separating means 40 which is shown in the drawing as a multiclone separator which may be any suitable form of separator such as for example, one or more cyclone separators. The separating means 40, functions to separate most of the entrained catalyst particles from the reaction vapors and the separated catalyst particles are returned to the bed of fluidized material 36 through dip pipe 41 which extends below the level 37 of the fluidized bed.

If desired, the catalyst particles collecting in the separating means 40 may be fluidized by the injection of a fluidizing gas thereinto to maintain the particles in fluidized condition. The reaction products leave the separating means 40 through line 42 and are preferably passed to a fractionating system not shown or any suitable means for separating the desired products. Any entrained catalyst particles in the vapors are scrubbed out by condensate liquid in the bottom of the fractionating tower.

During the reaction the catalyst particles in the reaction vessel 35 become fouled or spent and in this form of the invention the spent catalyst particles in fluidized condition are withdrawn from the bottom of the reaction vessel 35 and are introduced into standpipe 43. Before the catalyst particles are withdrawn they are mixed with stripping gas introduced through lines 38. The stripping gas functions to remove entrained and adsorbed hydrocarbons or other reactants from the catalyst particles.

One or more fluidizing lines 44 may be used for introducing gas into the standpipe 43 for maintaining the particles in fluidized condition in the standpipe. The standpipe 43 is provided with a shut-off valve 45 and a control slide valve 46 for controlling the rate of withdrawal of spent catalyst from the standpipe 43. The spent catalyst passing through valve 46 is mixed with air or other regenerating gas introduced through line 47 and the less dense mixture is passed through line 48 into the bottom of a regeneration vessel 49, below the distribution grid 50 in the bottom portion thereof.

The reaction vessel 35 in its upper portion operates under a slight super-atmospheric pressure to enable the reaction products to be passed through the fractionating equipment not shown. The fluidized bed 36 and the fluidized particles in the standpipe 43 function similarly to a liquid to produce hydrostatic pressure at the bottom of the standpipe 43. This hydrostatic pressure plus the back pressure in the reaction vessel 35 is sufficient to remove the less dense catalyst mixture through line 48 and through the regeneration vessel 49.

The velocity of the regenerating gas is so selected that the catalyst particles undergoing regeneration, are maintained as a fluidized bed shown at 51 having a level at 52. The velocity of the regenerating gas passing through the regeneration zone 49 may be from about ½ to 2 feet per second. The fluidized bed 51 is the relatively dense phase, and the phase above the dense phase shown at 53 is the dilute phase in which there is only a small amount of catalyst particles suspended in the regeneration gases. Regenerated catalyst is withdrawn from the lower portion of the dense bed 51 through funnel-shaped member 54 from which the fluidized dense catalyst particles flow into a second standpipe 55 provided with a shutoff valve 56 and a slide control valve 57.

The slide control valve 57 controls the amount of regenerated catalyst particles being introduced into line 31 formerly described. The regenerated catalyst in the standpipe 55 is maintained in fluidized condition by the introduction of fluidizing gas through lines 58 arranged at intervals along the length of the standpipe 55. The pressure produced by the column of fluidized particles in the standpipe 55 plus the pressure produced by the fluidized particles in the dense bed 51 are sufficient to force the catalyst particles in less dense condition through line 31 and into the reaction vessel 35 as above described.

The regeneration gases leaving the dense phase or bed 51 pass into the upper portion or less dense phase 53 of the regenerator 49. When using powdered synthetic silica alumina gel catalyst, the density of bed 51 is about 10 lbs. per cubic foot to 25 lbs. per cubic foot, and the density of the dilute or less dense phase 53 is about .003 lb. per cubic foot to .016 lb. per cubic foot. The regeneration gases are then passed through separating means 60 which is shown as a multiclone separator arranged in the upper part of the regenerator vessel. Other form of separating means may be used such as one or more cyclone separators or the like. The separated regenerated particles are returned to the dense bed 51 by return pipe 59 extending from the separating means 60 to a point below the level 52 in the regeneration vessel 49.

The regeneration gases leave the regeneration vessel 49 through line 61. These regeneration gases still contain entrained catalyst particles and the regeneration gases are preferably passed through another separation step before being vented to the atmosphere. The regeneration gases may be passed through a heat exchanger 62, such as a waste heat boiler for recovering some of the heat from the gases. The cooled regeneration gases are then passed through line 63 to an electrical precipitator 64, or other dry separating equipment wherein most of the entrained catalyst particles are removed. The regeneration gases then pass into line 65 to the atmosphere.

The separated fines accumulate or are collected in the bottom portion of the electrical separator 64 and these particles may be maintained in fluidized condition by the introduction of fluidizing gas introduced into the bottom portion of the separator 64 through lines 66. The catalyst fines are sometimes difficult to fluidize and preferably a part of the coarser catalyst from the dense bed 51 in the regeneration vessel 49 are passed into the bottom portion of the separator 64 for admixture with the catalyst fines.

The separated particles are introduced into standpipe 67 provided with fluidizing lines 68 for maintaining the particles in fluidized condition. Standpipe 67 is provided with shut-off valve 69, and slide control valve 70. The catalyst particles are mixed with a carrier gas such as air introduced through line 71 and the less dense mixture is passed through line 72 and is preferably returned to the dense bed 51 in the regeneration vessel 49. It is not believed necessary to develop a description of the process of Figure I more fully. This process as heretofore described is no part of the present invention and is merely presented for the purpose of properly disclosing the present invention.

In the regeneration vessel 49, the regeneration gases in the dilute phase 53 contain carbon dioxide, carbon monoxide, and oxygen. While the burning of the coke or carbonaceous material on the catalyst is taking place in the dense phase 51 the heat is taken up by the catalyst particles and the hot catalyst particles are consequently used for supplying the heat of reaction in the reaction vessel 35, or both heat of reaction and heat of vaporization for the reactant. However, in the dilute phase of the regenerator, there is only a small amount of catalyst particles present and the carbon monoxide in the presence of oxygen burns rapidly if conditions permit it. The result of this burning, which has been identified as after-burning, is the formation of carbon dioxide from the carbon monoxide with the evolution of heat.

It has generally been appreciated that the phenomenon of after-burning is a complicated chemical reaction dependent on the amount of carbon dioxide, carbon monoxide, and oxygen, together with the temperature existent in the regenerator. It has been attempted to evaluate these factors so as to determine the critical percentages for each of the reacting constituents at different regenerator temperatures. This has not appeared to be a practical solution to the problem of preventing after-burning however, due principally to the complexity of the after-burning phenomenon. In accordance with this invention, therefore, it has been discovered that the rate of change of the carbon monoxide content of the regenerator dilute phase gases is a critical control factor by itself. In particular, it has been discovered that the particular value of carbon monoxide content may not be particularly critical, but that the rate of change of carbon monoxide content is critical. Thus, while a carbon monoxide content of about 5% in the dilute phase of the regenerator may cause after-burning under some conditions, a carbon monoxide content of 10% will not cause after-burning under other conditions. However, a rapid change of carbon monoxide content when operating variables are constant, has been found to invariably indicate danger of after-burning.

In accordance with this invention, therefore, a sample of the gases present in the dilute phase 53 of the regenerator are withdrawn. These gases are analyzed for carbon monoxide content in such a way as to obtain the rate of change of carbon monoxide content. As illustrated in Figure I, sampling of the regenerator gases may be made by withdrawing gases through line 73. These gases are passed through a filtering means 74 and then at least a portion are passed on through the filter through line 75 into cooling means 76. The greater portion of the gases are returned to the regenerating system through line 85 leading into line 61. The cooling means 76 may be any desired type of cooler suitable for dropping the temperature of the hot regenerator gases sufficiently to substantially condense all moisture therefrom. From cooler 76, the gases pass through line 77 into a further filter 78 which is preferably of a very fine type such as a cotton filter to completely eliminate any remaining solids in the gas. From filter 78, the gas is passed through line 79 to the carbon monoxide analyzer 80. This carbon monoxide analyzer may be of any desired instantaneous continuous type. It has been found that an infra-red type of gas analyzer is particularly suitable for this application. Essentially the type of infra-red gas analyzer preferred is of the split beam type identifying carbon monoxide by selective infra-red absorption. In this analyzer a Wheatstone bridge circuit is employed to detect the unbalance between the two beams of infra-red radiation, in one of which the carbon monoxide containing gas is interposed contained in a sample cell. The output of the analyzer 80 may be passed through the electrical leads 81 to a control instrument 82 operated to control the operation of a solenoid operated valve 83. Valve 83 is positioned in a water line leading to outlets or nozzles within the regenerator 49 in the upper or dilute phase portion of the regenerator. These nozzles are identified by the numeral 84 in Figure I.

In applying this apparatus to the control of the operating conditions in the regenerator 49 the gas sample withdrawn from the regenerator is passed to the carbon monoxide analyzer 80 in a time interval of only a few seconds. The carbon monoxide analyzer 80 thus substantially instantaneously analyzes the carbon monoxide content of the gas present in the regenerator 49. By observing the output of the carbon monoxide analyzer 80, it is possible to readily detect the rate of change of carbon monoxide gas in the regenerator. By manual means it is then possible to control the operating variables connected with the regenerator 49 and the reactor 35 to prevent any danger of after-burning and to control other operating variables critically as will be brought out more fully as this description proceeds. Alternatively, the output of the analyzer 80 may be passed to the control instrument 82 which is adapted to respond to the rate of change of output of the analyzer 80 so as to control the solenoid valve 83 responsive to a critical preset rate of change in the carbon monoxide content. Operation of the valve 83 by the control instrument 82 will serve to release a flow of water into the dilute phase of the regenerator 51 so as to cool down this regenerator.

While the particular sampling technique used is not a part of this invention, the sampling technique must be suitable for securing a clean dry sample of the gas from the regenerator. Furthermore, there must be no time lag in the sampling procedure. Particularly effective means for achieving this have been indicated in the drawings. Particular attention may be called to the type of filter identified by the numeral 74. This filter may be of a type such as a carborundum filter adapted to filter out the coarser catalyst particles from the gas stream withdrawn from the regenerator through line 73. The filter element is arranged within the filter 74 so as to cover the inlet to line 75 which carries the gases from the filter. At the same time a portion of the gases leaving the regenerator through line 73 blow over the surfaces of this filter to be by-passed through line 85 back to the line 61 conducting the main body of regenerator gases from the regenerator. This circulation of gases through the filter 74 may be readily obtained by placing an orifice 86 immediately after the gases leave the regenerator and before the line 85.

The particular manner in which the rate of change of carbon monoxide content is used to control the operating conditions of the regenerator will be brought out more fully hereinafter.

Referring now to Figure II of the drawings, the reference numeral 90 designates a reaction vessel, and the reference numeral 91 designates a regeneration vessel somewhat similar to those described in connection with Figure I. In the form of the invention shown in Figure II, all of the catalyst particles pass overhead from the reaction vessel 90 with the vaporous or gaseous reaction products, and all of the regenerated catalyst passes overhead from the regeneration vessel 91 with the regeneration gases through line 117.

Regenerated catalyst from the standpipe 92 is mixed with heated reactant such as hydrocarbon vapors introduced through line 93 and the mixture is passed through line 94 into the reaction vessel 90 below the distribution plate 95. The reactant may comprise hydrocarbons which are to be converted or cracked but other reactants may be used as previously indicated. The velocity of the reactant vapors or gases is so selected that the catalyst particles are maintained in a fluidized turbulent condition in the vessel 90. As indicated in connection with Figure I in the catalytic conversion of hydrocarbons, the hydrocarbon to be employed may comprise a hydrocarbon oil such as gas oil, light gas oil, heavy gas oil, naphtha, crude oil, reduced crude oil, residual oils, or other hydrocarbon stock to be converted. The catalyst is a suitable conversion catalyst. The catalyst is preferably in powdered form having a size of about 200 to 400 standard mesh or finer, but coarser catalyst may be used. In the catalytic cracking of hydrocarbons about one part of catalyst to one of oil, to about thirty parts of catalyst to one part of oil by weight may be used. The temperature during cracking is about 800° F. to about 1000° F. Higher or lower temperatures may be used for other reactions.

The fluidized catalyst in the vessel 90 when using powdered synthetic silica alumina gel has an average density between about five pounds per cubic foot to about thirty-five pounds per cubic foot. Under certain conditions a bed of dense catalyst having a level will be obtained. When using powdered, acid-treated bentonite clays as the catalyst about the same densities are obtained.

The reaction products in gaseous form leave the reaction vessel 90 through line 96 together with entrained catalyst. This mixture is passed to a first cyclone separator 97, in which the bulk of the catalyst particles is removed from the gaseous reaction products. The separated catalyst particles collect in the bottom of the separator at 98 and are passed to a hopper 99 by means of dip pipe 100 which dips below the level 101 in the hopper 99.

Similarly the reaction products pass on to the second and third cyclone separators 103 and 106 through lines 102 and 105. Each separator removes successive portions of the catalyst entrained in the gaseous reaction products, returning the catalyst to vessel 99 by means of dip pipes 104 and 107. A pressure balance line 155 leading from the top of the hopper 99 to the outlet line 102 from the first cyclone separator 97 is provided to prevent pressure from building up in the hopper 99.

The reaction products leave the third cyclone separator 106 through line 108 and may be cooled and then passed to an electrical precipitator not shown for recovering further amounts of catalyst from the reaction products.

Inlet lines 110 are provided in the lower portion of the hopper 99 for introducing fluidizing gas to the catalyst in the hopper, maintaining the catalyst in a fluidized condition having a level 101. The fluidized catalyst is drawn from the hopper through standpipe 111 positioned in the lowermost part of the hopper. Fluidizing gas is introduced to this standpipe through inlet lines 112 for maintaining the catalyst in fluidized condition. Flow of the catalyst through standpipe 111 is controlled by shut-off valve 113 and slide-control valve 114.

Catalyst from standpipe 111 is introduced to line 118 through which it is carried by means of air introduced through inlet line 115. Line 118 carries the catalyst into the lower part of regenerator 91 beneath the distribution plate 116. The regenerator is operated similarly to the reaction zone 90 so as to maintain the catalyst to be regenerated in a fluidized condition. The regenerator temperature is maintained at about 1000° to 1100° F. so that the air in contact with the spent catalyst burns off the combustible materials on the catalyst to regenerate it.

The regenerated catalyst and the gases present in the regenerator leave the regenerator through line 117 for introduction to a first cyclone separator 119 positioned above a hopper 120. This separator removes most of the regenerated catalyst and sends it to hopper 120 through the dip pipe 121. The gases and remaining catalyst particles then pass to the second and third cyclone separators 124 and 127 through lines 123 and 126. From each of these separators the segregated regenerated catalyst is transferred to the hopper 120 through dip pipes 125 and 128.

The regeneration gases leave the third cyclone separator through line 129 and may be cooled and then passed to an electrical precipitator not shown, or other suitable separation equipment for separating or recovering further amounts of catalyst from the regeneration gases. The recovered catalyst is preferably returned to the regenerator.

To prevent the pressure from building up in the hopper 120, balance line 130 is provided which leads from the top of the hopper 120 to the outlet line 123 from the first cyclone separator 119.

The hopper 120 is provided with inlet lines 131 in its lower portion for introducing fluidizing gas to the regenerated catalyst in the hopper. The fluidized regenerated catalyst which may be at a temperature of about 1000° F. to about 1200° F. flows into the standpipe 92 hereinbefore described. Fluidizing lines 132 are provided for introducing fluidizing gas at spaced intervals along the standpipe 92 to maintain the catalyst particles in fluidized condition. In the dry fluidized condition the regenerated catalyst particles assume some of the characteristics of a liquid and hydrostatic pressure is built up at the base of the standpipe 92 which is utilized for moving the regenerated catalyst particles through the reaction vessel 90 and the rest of the equipment. Standpipe 92 is provided with shut-off valve 133 and slide control valve 134 for controlling the rate of withdrawal of catalyst from the standpipe.

In the regeneration vessel 91 the regeneration gases contain $CO_2$, CO, and oxygen and other combustibles which are not completely burned in the regenerator. While the burning during regeneration takes place in the regenerator 91 the liberated heat is absorbed by the catalyst particles and the temperature is maintained within safe limits. The concentration of the catalyst particles in the regeneration gases passing through line 117 is of the order of seven-tenths pounds per cubic foot to about 2.5 pounds per cubic foot. Within this density range there is not much danger of after-burning due to the burning of CO to $CO_2$ because the catalyst particles pick up any heat of regeneration or combustion of CO occurring in line 117. However, in the line 123 after most of the catalyst particles have been removed there is only a small amount of catalyst particles present, and with CO and combustibles present, the CO and combustibles in the presence of oxygen may burn rapidly and if the temperature rises, for example, to about 1150° F. there is danger of undue after-burning. The concentration of the catalyst particles and the regeneration gases in line 123 is about .05 pound per cubic foot to .2 pound per cubic foot. The oxygen content of the regeneration gases leaving the dense bed is about 3 to 5%.

In accordance with this invention, in order to prevent after-burning in line 123 and other parts of the equipment, a line 140 is provided leading from line 123 from the first cyclone separator 119. A portion of the gas from the first cyclone separator is passed through line 140 and through filter 141. The greater part of the gas is returned to line 123 through line 142 being used to clean the filter surfaces of filter 141. Suitable pressure differentials to accomplish this circulation of the gas may be provided by positioning orifice 156 in line 123 as shown. The residue of the gas filtering through the filter 141, is conducted through line 143 to a cooling means 144 wherein the gases are cooled sufficiently to condense substantially all moisture in the gases. From cooler 144, the dry gases are passed through line 145 to a further filter 146 which is preferably adapted to remove the extremely fine particles and may be constructed of cotton filter surfaces for example. From filter 146 the gases pass through line 147 to the CO gas analyzer 148. As indicated in connection with Figure I, the nature of the gas analyzer 148 will be developed more fully in connection with the description of the remaining figures of the drawings. The signals developed by the carbon monoxide analyzer 148 may be conducted through the electrical leads 149 to a control instrument 150 which is effective for operating the solenoid valve 151, responsive to a critical rate of change of carbon monoxide as indicated by the analyzer 148. Operation of valve 151 serves to permit a flow of water to pass through line 152 into the nozzles provided in the upper part of the regeneration vessel 91. The flow of this water cools down the gases leaving the regenerator sufficiently to eliminate danger of after-burning in the line 123 and other parts of the equipment. If desired, the solenoid operated valve 151 or equivalent mechanism may be employed in other parts of the process apparatus to have the same effect. For example, valve 134 may comprise a solenoid operated valve such as valve 151. Control of this valve by the instrument 150 within certain preset limits will control the rate of catalyst circulation through the reactor 90 and so will control the temperature existing in the regenerator 91 so as to control after-burning. It is apparent that the CO analyzer 148 may in this manner be used to control the operating conditions in a variety of ways not specifically indicated.

Referring now to the remaining figures of the drawing, a description of a suitable carbon monoxide analyzer is presented. While the nature of this analyzer is not a part of this invention a full description of this analyzer is given so that the present invention may be fully appreciated and may be made operative. Essentially, the apparatus described is a conventional type of infra-red gas analyzer. The apparatus comprises the usual type of split beam infra-red analyzer, although it is necessary to adopt certain novel operating principles in connection with the analyzer so as to accurately detect the carbon monoxide content in the stream from the regenerator gases. A typical composition for the regenerator gas stream is indicated in Table I following:

Table I

| Constituent | Average | Normal Range | Extreme |
|---|---|---|---|
| | Per cent (mol) | Per cent (mol) | Per cent (mol) |
| Carbon Monoxide | 8.3 | 7.5–9.5 | 4.0 |
| Carbon Dioxide+Sulphur Dioxide | 9.1 | 8.0–9.5 | 13.0 |
| Oxygen | 2.1 | 1.0–3.0 | 0.0 |
| Nitrogen | 80.2 | Difference | Difference |
| Methane | 0.0 | 0–1.0 | 0–1.0 |
| Hydrogen | 0.3 | 0–1.5 | 0–1.0 |

It is apparent that a suitable carbon monoxide indicator for this stream must be insensitive to all components except carbon monoxide in whatever proportions they may be present as shown in the above table. In addition, the presence of higher hydrocarbons such as ethane, propane, butane, and so on must not affect the reading of the carbon monoxide recorder. In order to accurately indicate the carbon monoxide, it is preferable to employ the apparatus to be hereinafter described, and also to employ the analytical procedure to be described in detail. This analytical procedure is described in general terms to permit adaptation of the analysis procedure indicated to any type of regeneration gas stream.

Referring now to Figure III, it will be noted that the analyzer comprises a housing 1 in which the optical equipment and gas cells are placed. A light source 2, capable of emitting infra-red radiation is placed at one end of the analyzer. To each side and behind the light source are placed concave mirrors 3 and 4, which serve to direct the light from source 2 along the paths indicated. Light from the mirrors 3 and 4, is transmitted along separate paths through a sample cell 5 and then through either a filter cell 6 or a compensator cell 7 onto resistance thermometers 8 and 9. The apparatus is so arranged that both beams of light pass through the sample cell 5 while only one of the beams of light pass through the filter cell 6 and the other beam passes through compensator cell 7. The cells are each provided with openings to permit introduction and withdrawal of fluids. "Trimmers" 10 and 11 are provided in the light paths adjacent to the mirrors. These trimmers are adapted to change the amount of radiation passing them and reaching the sample cell. The trimmers, for example, may be opaque plates constructed so as to permit screwing them into or out of the path of the light so as to permit more or less radiation to pass and to reach thermometers 8 and 9.

Any type of differential temperature measuring device may be used with the apparatus of Figure III. In Figure III differential resistance thermometers are used. Radiation of each of the beams falls upon one of the thermoresistance elements 8 and 9. These elements are contained in a conventional electrical bridge network as illustrated. The condition of electrical balance of this bridge is amplified and recorded by the amplifier 15 and the recorder 16.

In accordance with the preferred analytical procedure to be used in the practice of this invention, a gas analyzing apparatus corresponding essentially to that shown in Figure III may be employed. In an especially desirable modification the apparatus differs from the apparatus described in that a particular sample cell is employed. Referring to Figure III, it will be noted that the sample cell 5 has a transparent face plate 22 exposed to the light source and has a parallel transparent plate 23 through which light may pass toward the radiation detectors. In the preferred modification, the sample cell employed is not one in which the sides of the cell are parallel but is a sample cell in which the sides are non-parallel. The transparent faces of the cell are at an angle of about 15°. A suitable sample cell is represented in Figure IV of the drawings. The sample cell may, if desired be circular, having a cylindrical body 25. At one end of the body and perpendicular to the body of the cell is placed a plate 26 which is transparent to infra-red radiation. This plate may consist of silver chloride or calcium fluoride, for example. At the other end of the sample cell is placed a similar plate 27 which is so placed that it is not perpendicular to the cylindrical walls 25. By employing gas tight gaskets indicated by the numeral 28, it is possible to adapt this cell to the apparatus of Figure III. It will be noted that the sample cell has suitable inlets and outlets for passage into the cell and out of the cell of the gas composition to be analyzed. These passages are indicated by the numerals 29. In use the novel sample cell of Figure IV is placed in the apparatus of Figure III so as to permit rotation of the sample cell at will.

As described therefore, the gas analyzing apparatus to be employed in the practice of this invention preferably comprises an infra-red gas analyzer in which a sample cell is employed having non-parallel transmitting faces. The advantages of this construction will become apparent on understanding the analytical procedure which is to be followed in using the apparatus.

In accordance with the preferred analytical procedure of this invention, a multi-constituent gas sample is passed through the sample cell 25 of Figure IV in the type of apparatus shown in Figure III. Cell 25 is then rotated until a position is found at which each of the radiation detectors receives exactly the same quantity of radiation. Certain gases are then placed in the filter and compensator cells 6 and 7. The gases placed in these cells are so chosen as to make the instrument sensitive to the carbon monoxide. The light trimmers indicated by the numerals 10 and 11 on the drawing are then critically adjusted in such a way that the instrument will be selective to the particular constituent to be analyzed. The procedure necessary may thus be considered as comprising three steps. The first step is to critically adjust the rotational position of the sample cell 25. The second step is to suitably fill the filter and compensator cells with gases so as to sensitize the instrument to the carbon monoxide. The third step of the procedure is then to adjust the light trimmers to a critical setting so as to make the apparatus selective for the carbon monoxide in the presence of the other gases of the regenerated gas stream. Because of normal tolerances in the manufacture of the instrument, each of these steps of the analysis procedure are carried out by essentially a trial and error method. Suitable adjustments however, can only be achieved by carefully following the procedure to be hereafter disclosed. Each of the steps indicated will be described in detail.

The first step of the analytical procedure, as stated, is the critical adjustment of the rotational position of the sample cell 25. This may be done while the filter and compensator cells are either empty or contain the same composition. The step is necessary in order to equalize the radiation path lengths through the sample cell. Even the best sources of infra-red radiation tend to give off a non-symmetrical spatial distribution of radiation; that is, looking at the source from somewhat different directions, different intensities of radiation are received. Consequently, the length of the optical paths for the transmission of radiation reaching the detectors is not the same for each of the two beams. Thus if a conventional sample cell having parallel faces is employed, no precise clear cell optical balance point can be attained. By this it is meant that no adjustment of the optical trimmers can be found where the difference in the amount of radiation reaching the two detectors is zero for all gases or mixtures of gases placed successively in the sample cell. This is indicated in Figure V which will be described in detail as the description proceeds. This effect cannot be corrected by adjusting the light trimmers and furthermore, as will be seen, the trimmers are required to perform a different function. Therefore, the radiation path length intensity balance is obtained by rotating the sample cell 25. Due to the non-parallel structure of the cell windows the transmitting paths through the cell are of different lengths for the two radiation beams passing through the cells.

Rotation of the sample cell 25 will cause more or less path length to be added to one beam at the expense of the other beam. At each rotational position of sample cell 25 the sharpness of the clear cell balance point can be observed from a clear cell response pattern similar to that of Figure V. The desired rotational adjustment of cell 25 is attained when no change in detector signal output is observed upon passing a variety of infra-red opaque gases successively through the sample cell, as indicated by point P of Figure V. It may be noted that without this critical adjustment of the radiation path lengths of the sample cell, accurate results are not easily obtained in the carbon monoxide analysis of a regenerator gas stream.

In order to understand the procedure which is now employed it is necessary to appreciate the function and operation of the trimmers 10 and 11. Let it be assumed that both cells 6 and 7 are filled with nitrogen or some other gas transparent to infra-red radiation. If nitrogen gas is also placed in the sample cell 5 therefore, the adjustment of either of the optical trimmers 10 or 11 will result in a change of the signal output recorded on the recorder 22. If, for example, the trimmer 10 is moved so as to cast more shadow on the compensator cell 7, then the total energy detected by detector 8 will be decreased. Consequently, there will be a change in the signal output of the detector bridge and a voltage difference will be recorded by recorder 22. The unbalance of the detector bridge, may, of course, be brought back to a balanced condition by a corresponding adjustment of the trimmer 11 or by adjusting the bridge balancing potentiometer.

If now, in addition to nitrogen, various other gases which absorb infra-red radiation are passed successively through the sample cell at atmospheric pressure, and measurements are made of the detector bridge signal for a variety of positions of the optical trimmer 10, the resulting data when plotted will resemble Figure V. In Figure V the signals obtained for the different gases are plotted for each fixed trimmer position. The trimmer position is measured by the value of the nitrogen signal. Thus the line for nitrogen is at 45 degrees in Figure V, while the lines for the other gases A, B and C are at lesser angles.

The tangents of the angle of each line ($\tan \theta_A$, etc.) measure the fraction of the total radiation transmitted by the gas in the spectral region defined by the emitted spectrum of the source which is bounded and weighted in accordance with the transmission characteristics of the cell windows. The fraction of this radiation absorbed by the gas is $(1-\tan \theta_A)$, $(1-\tan \theta_B)$ etc. For example, the fraction of total radiation absorbed by certain gases as found with the aid of optical trimmers in combination with the instrument and method described above are listed in the following table:

| Gas at 1 Atmosphere, 128 F., 24 cm. cell | Fraction Absorbed from Radiation of Chromel Filament at 700° F. through calcium Fluoride Windows |
|---|---|
| Nitrogen | 0.00 |
| Carbon Dioxide | 0.10 |
| Methane | 0.23 |
| Ethane | 0.40 |
| Ethylene | 0.34 |
| Propane | 0.53 |
| Propylene | 0.60 |

Thus it is possible with the aid of the optical trimmers to make measurements of the relative opacities of individual gases and gas mixtures.

Returning to Figure V, which is designated as a response pattern, it can be observed that the lines for the various gases A, B, C, and nitrogen all cross at the point P. This point P is called the "clear cell optical balance point" of the instrument. At the particular trimmer adjustment for the point P, each of the absorbing gases cause the instrument to respond with the same signal. Thus at this condition of the trimmers, the absorbing gases are indistinguishable from nitrogen as well as from one another. Further if the pressure of the absorbing gases is increased or reduced from one atmosphere, no change in signal occurs when the trimmers are set for the point P, provided the optical paths have been equalized by the proper rotational position of cell 25 as described.

Now in order to develop selective sensitivity of this instrument to a single gas X in the presence of other gases A, B and C of a mixture, one of the cells 6 or 7, say cell 6, is filled with gas X, thereby sensitizing the instrument to gas X. Upon sensitizing the instrument to gas X, the resulting response pattern for relatively non-interfering gases is shown in Figure VI as typical. In the application of this analysis procedure to the present invention gas X is, of course, carbon monoxide.

It will be found that the clear cell balance point has moved from point P to Q. A readjustment of the optical trimmers is now necessary in order to operate at the desirable point R as illustrated. At this point R, the gases A, B and C are indistinguishable from nitrogen as well as from one another and at the same point R an appreciable signal is obtained for gas X or carbon monoxide.

The desirable operating point R is found for each instrument and for each analysis through the use of the optical trimmers. The various gases contained in the mixture to be analyzed are passed individually through the sample cell of the sensitized instrument. This is done at different optical trimmer settings until one particular setting is found at which the instrument response to all gases in the mixture but the one desired are identical. This procedure is carried out by setting the trimmers in at least two different positions for each gas until a plot such as Figure VI may be drawn. This will establish the trimmer setting which will correspond to point R. This trimmer setting is then retained for the desired analysis. Calibration for various proportions of gas X or carbon monoxide in gases A, B and C establishes a graduated scale of instrument signal against partial pressure or percentage of carbon monoxide in the mixture.

In cases where the gases of a mixture have similar absorption spectra, such as hydrocarbon gases of the same series, it is not possible to locate a point or region of minimum interference (point R, Figure VI) by adjustment of the optical trimmers alone. The response pattern for such a case resembles Figure VII. Here the instrument is sensitized to gas X by filling the filter cell 6 with gas X. In the response pattern of Figure VII gases B and C give signals as if they were partially like gas X. No trimmer adjustment can be found where good selectivity to gas X exists. However, by placing a suitable proportion of gases B and C, under a suitable pressure in cell 7, the response patterns of Figure VII may be altered or compensated to that of Figure VI. Use of the optical trimmers in the same manner as described is again necessary to locate and maintain the operating condition of the instrument at the point or region of minimum interference.

The procedure used to determine the gas composition to be included in the compensator cell 7 involves the following steps: First, a pure constituent, other than X, of the mixture being analyzed is placed in cell 7. In general, an infrared opaque gas of the mixture should be tried first. A response pattern is then obtained as described. The pressure of the gas in the cell 7 may also be varied while other response patterns are obtained. In the event these steps do not result in a non-interfering type of response pattern, it is necessary to repeat the procedure after adding another gas or gases to the cell 7. It is sometimes necessary to employ a gas not present in the gas mixture being analyzed. Saturated paraffin gases such as propane or butane have been used successfully. By following this procedure it is possible to find a gas composition to be placed in cell 7 which will change the response pattern from that of Figure VII to that of Figure VI. In other words it is possible to determine a gas composition which when interposed in one of the beams of the apparatus will result in a non-interfering response pattern. The composition may consist of one or more gases, but generally is characterized by containing a gas or gases which are relatively opaque to infra-red radiation.

As described, the following preferred procedure is to be followed in employing the apparatus described. First the light reaching each of the radiation detectors is balanced for equal sample cell path length by rotating the sample cell 25. Secondly, with each constituent of a gaseous mixture, containing a gas X the percentage of which is to be obtained, a response pattern is obtained by varying the trimmers so as to obtain curves such as are shown in Figures VI or VII. If the curves are that of Figure VI, by maintaining the trimmer settings indicated by line R, the apparatus may then be calibrated for different percentages of X and the analysis may then be conducted. If the curves such as shown by Figure VII result, it is necessary to find a proper gas composition for cell 7 to convert Figure VII to that of Figure VI. This is done by the procedure described. As stated, it will be found that gas compositions will result in curves of the nature of Figure VI, without necessity for employing a particular gas composition in cell 7, only if not more than one constituent of the gas mixture is opaque to infra-red radiation or if the gases are mutually non-interfering. In all other cases it is necessary to find and use the proper gas composition for cell 7. This is the case for example, in all analyses of gases containing more than one hydrocarbon as is generally the case in analyzing the regenerator gas stream.

In order to facilitate the adjustments for the maximum selective analytical properties of the instrument described in the above procedure, an interference cell may be used across both beams. By placing interfering gases such as B and C in Figure VII in the interference cell, their interfering effect can be reduced. With a reduced interfering effect the procedure for developing the maximum selectivity is easier to apply.

One further aid which has been found useful in conjunction with the procedure above in obtaining the desired selectivity for carbon monoxide in a mixed gaseous stream is in the adjustment of the sample cell length in proportion to the length of the other cells. In general it is found that using as short a sample cell as possible will increase the calibration linearity and selectivity of the instrument. The limiting factor, of course, is the sensitivity of the detector-amplifier-recorder system. In addition, use of a long interference cell will in general reduce the available signal but increase the overall selectivity.

Having now described the apparatus and the analytical procedure to be used, in adapting this apparatus to the analysis of the regeneration gas stream of the processes of Figures I and II, an example will be given of the specific adaptation of this analytical procedure to the regenerator gas stream of a fluid catalytic cracking operation. In this example the regenerator gas stream had a composition as indicated in Table I given heretofore. The analytical apparatus was sensitized by placing one atmosphere of carbon monoxide in cell 6 in one of the two radiation beams, and one atmosphere of carbon dioxide in the interference cell 30. The necessary trimmer setting for operation at the region of minimum interference is shown in the accompanying Figure VIII.

The instrument is then calibrated with blends of carbon monoxide and nitrogen to cover the desired range which was chosen to be 4½ to 10% of carbon monoxide. Use of the optical trimmers as described was essential to develop the maximum selectivity to carbon monoxide.

Employing this procedure, it was found possible to accurately and substantially instantaneously determine the carbon monoxide content of the regenerator gas stream with a high degree of accuracy. By this means is was possible to determine the critical rate of change of carbon monoxide. This rate of change of carbon monoxide may be obtained from inspection of the output of recorder 16 illustrated in Figure III. Thus the recorder 16 may be calibrated to show the amount of carbon monoxide present with respect to time. An operator can then detect from this chart, the rate of change of carbon monoxide so as to control the regenerator temperature in accordance with this invention. As indicated, it is alternatively possible to use the electrical output of amplifier 15 of the analyzer shown in Figure III to operate solenoid valve 83 of Figure I through the rate of change controller 82. Suitable controllers to be used as element 82 are known to the art and are generally referred to as rate action controllers. These controllers are responsive to the first derivative of the output of amplifier 15 with respect to time and so are responsive to the rate of change of carbon monoxide and may be used to operate solenoid valve 83 of Figure I as indicated.

Having now fully described the processes with which this invention is concerned and the apparatus and analytical procedure to be employed, the novel control method of this invention may be fully appreciated. As stated, the present invention is based on the discovery that the rate of change of carbon monoxide in the regenerator gas stream of the processes described is a critical control factor. It has been found that a particular rate of change of carbon monoxide in the regenerator gas stream indicates that the phenomena referred to as afterburning will occur. The following data is given as an example of the present invention:

The carbon monoxide content of the regenerator gas stream from the regenerator of a catalytic cracking unit was determined using the analytical procedure and apparatus described. The feed stock of the unit consisted of mixed gas oils and the operating conditions were 26,000 barrels per stream day feed rate, 943° F. reactor temperature, 37.5 tons per minute catalyst recirculation rate, and a space velocity of 1.89 feet per second, resulting in a conversion of 59.9%. The regenerator dense bed temperature was about 1100° F. while the temperature of the dilute phase was 1050° F. Throughout the test period, operating variables were maintained as nearly constant as possible. However, the dense bed temperature slowly increased during the test period to a maximum temperature of about 1110° F. A corresponding change in the lean phase temperature was not detectable although the lean phase temperature periodically fluctuated 6 or 7 Fahrenheit degrees above and below 1050° F. The carbon monoxide content of the regenerator gas stream was initially about 9.4%, fluctuating about 0.05% above and below this value. At a subsequent time when the dense bed temperature was about 1103° F. and when no significant change had occurred in the lean phase temperature, the carbon monoxide content suddenly began increasing at the rate of about 0.12% per minute. This rate of change of carbon monoxide continued until the carbon monoxide content had increased about 0.30% in 2.6 minutes. A short time thereafter afterburning began in the regenerator, that is, carbon monoxide present in the lean phase began to burn. At this instant the carbon monoxide content of the lean phase was 9.67% and the temperature was 1057° F. The afterburning was immediately indicated by the rate of change of carbon monoxide which dropped off rapidly. The rate of decrease was about 0.12% of carbon monoxide in one minute. In 2.6 minutes the decrease was about 0.30% and carbon monoxide content continued to drop at this rate to a value of about 9.0%. On noting the rapid change of carbon monoxide content, water was injected into the lean phase as indicated, immediately bringing the afterburning under control. At no time did the lean phase temperature reach 1060° F. and at no time did the dense phase temperature exceed 1110° F.

From data such as indicated in this example it has been found that at a constant throughput through the catalytic cracker and the regenerator, a sharp increase in carbon monoxide content in the regenerator gas stream as indicated shows inchoate afterburning. While some fluctuation in carbon monoxide content will occur during the operation of the regenerator, sharp changes do not occur at constant operating conditions and are indicative of afterburning conditions. Furthermore it has been found that afterburning may be immediately detected in the event it does occur, as indicated, by about the same rate of change of carbon monoxide as occurs immediately before afterburning begins. This invention is therefore of utility in detecting inchoate afterburning enabling substantial elimination of afterburning problems whenever the regenerator is being operated at substantially constant operating conditions. Should afterburning actually occur, this invention is of utility in immediately indicating the afterburning and providing substantial control of the afterburning.

As indicated by the example given, the critical change of carbon monoxide, whether increasing or decreasing, is about 0.12% per minute. It is contemplated that the limits of this critical rate of change are about 0.10% to 0.20% although greater rates of carbon monoxide change if encountered are certainly equally significant. Coupled with the critical rate of change of carbon monoxide, is the time over which the rate of change is maintained. In general, the change in carbon monoxide content is only significant if the indicated rate of change is maintained for at least about 2½ minutes or until the total change of carbon monoxide is at least about 0.3%. Normal fluctuations in carbon monoxide content encountered during regenerator operation fall outside the limits indicated so that change in carbon monoxide at the rate and of the magnitude stated have been found to be indication of afterburning conditions.

What is claimed is:

1. In a process for burning combustible deposits from solid particles in a fluidized regeneration system having a dilute phase of said fluidized solid particles, the improvement which comprises determining the rate of change of carbon monoxide present in the said dilute phase and decreasing the temperature of the said dilute phase whenever the said rate of change of carbon monoxide exceeds about 0.1% to 0.2% per minute for a period of time greater than about two and a half minutes.

2. The improvement defined by claim 1 wherein water is injected into the said regeneration system when the said rate of change is exceeded.

3. The method of preventing uncontrolled combustion of carbon monoxide in the dilute phase of a fluidized regeneration system for burning combustible deposits from contact particles which comprises the steps of determining the rate of change of carbon monoxide present in a dilute phase of the said system and lowering the temperature of the said dilute phase whenever the carbon monoxide has increased more than about 0.3% at a rate greater than about 0.1% per minute.

4. The method of controlling the combustion of carbon monoxide in the dilute phase of a fluidized system for burning combustible deposits from contact particles which comprises the steps of determining the rate of change of carbon monoxide present in the dilute phase and lowering the temperature of the said dilute phase whenever the carbon monoxide content has decreased more than about 0.3% at a rate greater than about 0.1% per minute.

5. In a process for burning combustible deposits from solid contact particles wherein oxidizing gas is passed upwardly through a burning zone under conditions controlled to maintain a relatively dense, turbulent, liquid-like phase in the lower portion of said zone superimposed by a dilute phase; the method of controlling the temperature in said dilute phase which comprises subjecting a sample stream of said gas from said dilute phase to infra-red radiation, utilizing the infra-red adsorption characteristics of the gas for determining the carbon monoxide content thereof and reducing the temperature of the dilute phase when the carbon monoxide content changes at a rate exceeding about 0.1% per minute.

WILLIAM MULY.
JOHN J. HEIGL.

REFERENCES CITED

The following references are of record in the file of this patent:

UNITED STATES PATENTS

| Number | Name | Date |
| --- | --- | --- |
| 2,393,839 | Thomas et al. | Jan. 29, 1946 |
| 2,409,751 | Gerhold et al. | Oct. 22, 1946 |
| 2,436,041 | Gerhold et al. | Feb. 17, 1948 |
| 2,451,573 | Myers et al. | Oct. 19, 1948 |
| 2,454,373 | Blanding | Nov. 23, 1948 |
| 2,454,466 | Le Roi | Nov. 23, 1948 |